United States Patent [19]

Kamins et al.

[11] Patent Number: 4,985,497

[45] Date of Patent: Jan. 15, 1991

[54] THERMOPLASTIC BLENDS CONTAINING ETHYLENE TERPOLYMERS AND THE PREPARATION THEREOF

[75] Inventors: Kathryn A. Kamins, Hockessin, Del.; Robert J. Statz, Kennett Square, Pa.

[73] Assignee: E. I. Du Pont de Nemours and Company, Wilmington, Del.

[21] Appl. No.: 236,441

[22] Filed: Aug. 25, 1988

[51] Int. Cl.$^5$ .................... C08L 55/02; C08L 101/06
[52] U.S. Cl. ........................................ 525/84; 525/83; 525/190
[58] Field of Search ................... 525/185, 190, 84, 80, 525/83

[56] References Cited

U.S. PATENT DOCUMENTS

| | | | |
|---|---|---|---|
| 3,780,140 | 12/1973 | Hammer | 260/884 |
| 4,172,859 | 10/1979 | Epstein | 428/402 |
| 4,613,533 | 9/1986 | Loomis et al. | 428/267 |

Primary Examiner—Allan M. Lieberman

[57] ABSTRACT

Terpolymers of various amounts of polymer repeat units of ethylene, acrylate ester, and carbon monoxide are intimately admixed with acrylonitrile/butadiene/styrene (ABS) resin to form a blend with a flex modulus of at least 1700 MPa. The resulting blend has enhanced impact strength properties over the resin alone. Such blends are useful as molding resins. The process for preparation of the blend involves admixing the terpolymer with the ABS resin.

4 Claims, No Drawings

THERMOPLASTIC BLENDS CONTAINING ETHYLENE TERPOLYMERS AND THE PREPARATION THEREOF

FIELD OF THE INVENTION

This invention relates to ethylene terpolymers and compositions and shaped articles formed therefrom. More particularly, this invention relates to terpolymers of polymer repeat units of ethylene, acrylate ester and carbon monoxide, wherein the terpolymers are blended together with acrylonitrile/butadiene/styrene (ABS) resins to enhance the physical properties of the resin, and to processes for preparing such blends.

BACKGROUND OF THE INVENTION

Commercially available plastics have been found to be useful because of the high rigidity of objects molded therefrom. However, this rigidity is often accompanied by brittleness or lack of toughness. Several blends of stiff polymers with other polymers have been made to improve the toughness of stiff polymers. One set of these blends involves mixing a stiff polymer with a soft, often rubbery polymer that is miscible with the stiff polymer on a molecular level. This produces a plasticized material that is essentially in one phase. However, this type of blend is almost always designed to produce flexible materials having reduced stiffness and lower heat resistance. Another set of polymer blends is prepared by combining a stiff polymer with certain polymers that are immiscible with it, creating a phase structure. The stiff polymer is typically a continuous phase, throughout which a soft polymer is located in a dispersed phase. A continuum of thermoplastic polymers with varying degrees of toughness is developed, depending on the amount of stiff polymer and soft polymer present. Another blend of polymers designed to increase toughness (such as already toughened ABS) is prepared by recycling degraded ABS and blending the recycled product with higher impact ABS. However, degraded ABS is often oxidized and crosslinked, and exhibits low flow which is detrimental to processing operations. Furthermore, ABS in general has poor weatherability characteristics (it ages and becomes embrittled at room temperature) and it thermally degrades due to processing heat. Blending in more ABS with the degraded ABS does not correct these deficiencies. In contrast, in the present invention a terpolymer not containing polybutadiene can be mixed with degraded ABS. Because a polymer with good weatherability has been added rather than the easily degradable polybutadiene, a longer lasting, toughened ABS may be formed.

U.S. Pat. No. 3,780,140 to Hammer discloses a polymer of ethylene, carbon monoxide and one or more monomers to produce solid products. The resulting polymer may be blended with solid organic polymers to produce flexible films and articles of varying flexibility. The patent recites a long list of solid organic polymers that can be used to produce a blend, including ABS resins. However, the ethylene/carbon monoxide/termonomer polymer must be compatible with the solid organic polymer. That is, the two polymers must preferably be miscible on a molecular scale. This suggests a one phase composition that is plasticized. In addition, the focus of this reference is to lower the modulus of the stiff polymer to varying degrees. In contrast, the blend of the present invention is directed to a toughened ABS resin that has a minimal reduction in stiffness and maintains a high modulus.

U.S. Pat. No. 4,613,533 to Loomis et al. describes a partially crosslinked, thermoplastic, elastomeric composition based on compatible blends of an ethylene/ester/carbon monoxide polymer and a vinyl or vinylidene halide polymer. There is no teaching of a composition including ABS resin.

U.S. Pat. No. 4,172,589 to Epstein discloses a toughened multi-phase thermoplastic composition in which one phase includes a polyester matrix resin and polycarbonate matrix resin and at least one other phase includes random copolymers. However, there is no teaching of a toughened ABS resin.

It is an object of the present invention to provide a soft, rubbery terpolymer that acts as an additional toughening agent for ABS resin. It is a further object of this invention to provide a toughened thermoplastic that retains its stiffness. It is yet another object of this invention to develop a toughened thermoplastic that retains a substantial percentage of both the original modulus and the heat distortion temperature (HDT) in a multi-phase polymeric system. These and other objects, features and advantages of the invention will become apparent in the description of the invention that appears below.

SUMMARY OF THE INVENTION

According to this invention, there is provided a toughened multi-phase thermoplastic blend comprising (a) 85–99 weight percent based on total blend of acrylonitrile/butadiene/styrene resin, and (b) 1–15 weight percent based on total blend of a terpolymer comprising 10–87 weight percent of polymer repeat units of ethylene, 10–50 weight percent of polymer repeat units of acrylate ester, and 3–40 weight percent of polymer repeat units of carbon monoxide. The blend has a flex modulus of at least 1,700 MPa.

According to another aspect of this invention, there is provided a process for the preparation of a toughened multi-phase thermoplastic blend comprising admixing components (a) and (b) described above, to produce a blend with a flex modulus of at least 1,700 MPa.

DETAILED DESCRIPTION OF THE INVENTION

The blend of the present invention has a complex phase structure. Component (a) of the blend, the ABS resin, may exist in any of a variety of configurations and a number of phases. In one configuration, chains of acrylonitrile/styrene copolymers contain branches of polybutadiene. This is the result of grafting polybutadiene directly onto the acrylonitrile/styrene copolymer chains. In the ABS resin, the polybutadiene branches tend to aggregate (but not bond) together. The aggregated polybutadiene may reach sufficient size to form a separate phase. This establishes regions or "pockets" of polybutadiene which may be a distinct phase that coexists with and is interspersed within regions of acrylonitrile/styrene copolymer. The acrylonitrile/styrene copolymer is typically in a continuous phase. A related configuration of ABS wherein the polybutadiene regions are enlarged is developed by supplementing the ABS resin with additional polybutadiene. These resulting ABS copolymers are stiff, due to the containment of the soft polybutadiene in isolated areas and the generally continuous phase of the acrylonitrile/styrene copolymer. Other configurations and phase structures are possible in ABS resins.

It is important to understand that because the configurations of ABS and the variety of phases contained within them are complex, the nature of the interaction of the terpolymer of the present invention with ABS resins is not precisely understood. While various explanations for this interaction are advanced below, they are suggested to assist the reader in understanding the invention, and not to conclusively assert any one explanation as appropriate.

The terpolymer of polymer repeat units of ethylene, polymer repeat units of acrylate ester, and polymer repeat units of carbon monoxide is a softer polymer than the ABS resin. It may be a separate phase throughout the complex phase structure of ABS resin, and it constitutes the smaller part of the blend. Moreover, there is always a phase structure throughout the blend, so that there is no appreciable mixing of components on a molecular level which would result in a loss of stiffness. However, there is at least surface compatibility among the phases.

It is important to recognize that ABS may already have a partially gelled or crosslinked butadiene rubber phase. The terpolymer further toughens ABS even though the terpolymer itself probably remains uncrosslinked.

Various intricate patterns and phase structures may exist when the terpolymer is combined with ABS resins. For all of these possible complex configurations, the ABS remains stiff, while the areas of polybutadiene together with the ethylene terpolymer increase the impact resistance of the ABS resin. As a consequence thereof, stiffness is reduced as little as possible while impact resistance is increased as much as possible.

Various ABS resins may be used. Another styrenic resin, styrene-acrylonitrile (S-AN) was modified with the ethylene polymer of the present invention. An improvement in the impact strength of the S-AN was achieved. However, because the S-AN resin alone had a low impact strength, even the resin toughened with E/nBA/CO when molded was fractional and not sufficiently toughened for the variety of applications contemplated in this invention. Similarly, persons skilled in the art may select any acrylate ester for a termonomer to be used in the ethylene copolymer. Exemplary of acrylate ester termonomers are methyl acrylate, ethyl acrylate, propyl acrylate, isopropyl acrylate, n-butyl acrylate and isobutyl acrylate. A preferred acrylate ester is n-butyl acrylate. It is preferred that the terpolymer be present in an amount of from 4 to 10 weight percent based on the blend. In one preferred embodiment according to the invention, the terpolymer is comprised of 40–79 weight percent of polymer repeat units of ethylene. In another preferred blend of the invention, the terpolymer is comprised of 15–40 weight percent of polymer repeat units of acrylate ester. In still another preferred embodiment of the invention, the terpolymer is comprised of 6–20 weight percent of polymer repeat units of carbon monoxide.

The melt index range (according to ASTM D-1238) for the terpolymer of the toughened multiphase thermoplastic blend of the present invention is from 0.1 to 100 g/10 min, and preferably from 1 to 50 g/min.

The blends of the present invention are useful in a variety of capacities to manufacture a variety of products. In general, these blends have applicability wherever ABS resins are used, and whenever better performance of these resins is desired. Such applications include decorative or structural parts for automobile interiors, instrument or computer housings, light duty gears, and parts for the electrical industry. They may be in the form of self-supporting films or sheets, molded articles, tubing, and the like. The blends are useful whether the ABS resin is virgin (in which case the terpolymer fortifies or supplements the toughening effect of polybutadiene) or regrind (in which case the terpolymer can mix with the embrittled polybutadiene to increase its resistance to age deterioration). The ABS-ethylene terpolymer blends can also find utility for the modification of other polymer systems.

The blends of the present invention may be prepared by conventional techniques known to persons skilled in the art of compounding and extruding polymers. For example, these blends may be prepared by twin screw extrusion, single screw extrusion, intensive mixing, and using a roll mill, among other techniques. It is important when preparing the blend to adequately mix the components, so that the terpolymer is well distributed throughout the ABS resin. The terpolymers according to this invention can be prepared according to the procedure detailed in U.S. Pat. No. 3,780,140, incorporated by reference herein, or variations thereof.

The subject invention will be more fully appreciated with reference to the examples that follow:

EXAMPLES

The blends of the examples were prepared by twin-screw extrusion. A 28 mm twin screw (trilobal) extruder was used to admix ABS with differing levels of various ethylene terpolymers at a melt temperature of 420° F. The ABS used in all of these Examples and Comparative Examples is the commercial product M-248, a medium impact grade of ABS manufactured by Monsanto. In the Comparative Examples, the ability of ethylene/vinyl acetate/carbon monoxide (abbreviated "E/VA/CO") terpolymers to increase the impact strength of the ABS resin was evaluated. For each Comparative Example, the terpolymer composition and its weight percent is included. In addition, the melt flow of the terpolymer is listed, as measured according to ASTM-D-1238-65T, Condition E (190 C for a 2160 g load). The particular terpolymer used in the examples that illustrate the invention is ethylene/n-butyl acrylate/carbon monoxide (abbreviated "E/nBA/CO"). E/nBA/CO can be prepared according to the disclosure of U.S. Pat. No. 4,613,533, incorporated by reference herein. Tensile and flex bars used to measure critical data in the Examples and Comparative Examples were injection molded using a 7 oz. Stokes machine at a melt temperature of 455 F. A notched Izod test to measure impact strength was conducted according to ASTM D-256, at 23 C and 0.C. Flex modulus was measured according to ASTM D-790. HDT was measured according to ASTM D-648 and at .455 MPa; samples were annealed overnight in an oven at 70 C. Tensile strength measurements were performed using ASTM D-638TB.

COMPARATIVE EXAMPLE 1

The ABS resin alone was molded into a test sample. The sample revealed notched Izod values of 75.1 joules/meter (J/m) at 23.C and 98.2 J/m at 0° C. The sample had a flex modulus of 2937.27 megapascals (MPa) and a tensile strength of 52.08 MPa. The sample had a HDT of 92.5° C.

EXAMPLE 1

A blend of ABS resin containing 4 weight percent (based on total composition) E/nBA/CO was prepared. Subsequent analyses of the composition revealed notched Izod values of 250.4 J/m at 23 C and 121.2 J/m at 0 C. The sample had a flex modulus of 2675.26 MPa and a tensile strength of 51.15 MPa. The HDT for the sample was 92.5° C.

Therefore, the introduction at modest levels of a terpolymer of ethylene, n-butyl acrylate, and carbon monoxide into ABS resin, which exemplifies the invention claimed herein, causes a marked increase in "toughness" or impact strength as evidenced by the higher notched Izod test values relative to those of the ABS resin of Comparative Example 1. Moreover, the flex modulus decreased only slightly for this modified ABS resin in relation to the ABS resin of Comparative Example 1; this indicates that the blend when formed into a useful product maintains its "stiffness" (it is not plasticized or "soft"). Tensile strength remained relatively unchanged and HDT did not change at all from the ABS resin to the modified ABS resin.

EXAMPLE 2

A blend of ABS resin containing 6 weight percent (based on total composition) E/nBA/CO was prepared. Subsequent analyses of the sample revealed notched Izod values of 272.8 J/m at 23 C and 127.0 J/m at 0° C. The sample had a flex modulus of 2613.21 MPa and a tensile strength of 49.83 J/m. The HDT for the sample was 92.C Thus, increasing the amount of E/nBA/CO in the blend leads to an improved impact strength of the sample, compared to ABS compositions containing only 4 weight percent E/nBA/CO and especially compared to the ABS composition alone. Flex modulus, tensile strength and HDT properties for the composition of this Example, like those of Example 1, are relatively unchanged opposite the ABS resin of Comparative Example 1.

EXAMPLE 3

A blend of ABS resin containing 10 weight percent (based on total composition) E/nBA/CO was prepared. Subsequent analyses of the sample revealed notched Izod values of 312.8 J/m at 23.C and 121.2 J/m at 0° C. The sample had a flex modulus of 2427.04 MPa and a tensile strength of 46.56 MPa. The HDT for the sample blend was 92.5 C. This Example demonstrated that increasing the level of ethylene termonomer to 10% in the ABS resin further elevates the impact resistance of the blend. Note that despite a decrease in the lower temperature impact test value compared to Example 2 (which is probably due to experimental error), the impact resistance at 0 C for this sample is equal to that of Example 1 and superior to that of Comparative Example 1. The tensile strength of the sample of the instant example remained relatively unchanged compared to that of the ABS resin of Comparative Example 1. Further, the HDT for the compositions of this Example, Example 1 and Comparative Example 1 are the same, while the HDT of Example 2 decreased negligibly from the HDT of Comparative Example 1. This indicates that the HDT is substantially the same for pure ABS resins and the ABS resins modified with the subject terpolymer. This minor fluctuation in HDT can be due to experimental error; in any event, very little if any plasticization occurs.

While these three examples illustrate the beneficial effects of adding E/nBA/CO to ABS resin, similar results are achievable using any acrylate ester. Moreover, while the examples illustrate the use of E/nBA/CO in concentrations of 4, 6 and 10 weight percent used on total composition, it is understood that concentrations of 1-15 weight percent of the terpolymer claimed herein will enhance the impact resistance of ABS according to the invention.

COMPARATIVE EXAMPLE 2

A blend of ABS resin containing 10 weight percent (based on total composition) of an E/VA/CO terpolymer was prepared. This terpolymer consisted of 66 weight percent ethylene/24 weight percent vinyl acetate/10 weight percent carbon monoxide; it had a melt index of 35 g/10 min. Subsequent analyses of this sample revealed notched Izod values of 176.7 J/m at 23° C. and 75.8 J/m at 0.C. The blend had a flex modulus of 2482.2 MPa and a tensile strength of 48.92 MPa. The HDT for the sample was 92.C. Thus, the blend of this Comparative Example containing E/VA/CO only negligibly toughens the ABS resin when measured at 23° C. and actually embrittles the ABS resin when measured at 0 C. This demonstrates the unique and unexpected properties of the terpolymer of the present invention compared to those of other terpolymers. Namely, unlike other terpolymers, the present ethylene/acrylate ester/carbon monoxide terpolymer actually toughens the ABS resin.

COMPARATIVE EXAMPLE 3

A blend of ABS resin containing 4 weight percent (based on total composition) of an E/VA/CO terpolymer was prepared. This terpolymer consisted of 62.5 weight percent ethylene/28.5 weight percent vinyl acetate/9 weight percent carbon monoxide; it had a melt index of 35 g/10 min. Subsequent analyses of this sample revealed notched Izod values of 211.9 J/m at 23 C and 106.8 J/m at 0.C. The blend had a flex modulus of 2758 MPa and a tensile strength of 52.58 MPa. The HDT for the sample was 91° C. Again, the impact resistance of the modified ABS resins according to the instant invention are superior to that of the E/VA/CO modified resin of this Comparative Example. Note that the notched Izod value at 0 C for this composition is the highest of any Comparative Example composition (or any other comparative composition tested) at this temperature; yet it remains inferior to the lowest notched Izod value at 0.C for the samples of the instant invention reviewed in Examples 1-3.

COMPARATIVE EXAMPLE 4

A blend of ABS resin containing 10 weight percent (based on total composition) of the terpolymer of Comparative Example 3 was prepared. Subsequent analyses of this sample revealed notched Izod values of 239.1 J/m at 23 C and 96.1 J/m at 0 C. The blend had a flex modulus of 2482.2 MPa to a tensile strength of 49.44 MPa. The HDT for the sample was 91 C. The sample of this particular Comparative Example had the greatest notched Izod value at 23.C of any Comparative Example compositions (or any other comparative compositions tested) at this temperature; again, this value is less than even the lowest notched Izod value at 23.C for the samples of the instant invention reviewed in Examples 1-3.

COMPARATIVE EXAMPLE 5

A blend of ABS resin containing 10 weight percent (based on total composition) of an E/VA/CO terpolymer was prepared. This terpolymer consisted of 71 weight percent ethylene/26 weight percent vinyl acetate/3 weight percent carbon monoxide; it had a melt index of 20 g/10 min. Subsequent analyses of this sample revealed notched Izod values of 168.7 J/m at 23° C. and 43.2 J/m at 0 C. The blend had a flex modulus of 2385.67 MPa and a tensile strength of 47.97MPa. The HDT for this sample was 92° C.

COMPARATIVE EXAMPLE 6

A blend of ABS resin containing 6 weight percent (based on total composition) of an E/VA/CO terpolymer was prepared. This terpolymer consisted of 71.5 weight percent ethylene/20.5 weight percent vinyl acetate/8 weight percent carbon monoxide; it had a melt index of 15 g/10 min. Subsequent analyses of this sample revealed notched Izod values of 192.2 J/m at 23.C and 91.8 J/m at 0.C The blend had a flex modulus of 2627 MPa and a tensile strength of 52.03 MPa. The HDT for this sample was 92.C. Thus, for this terpolymer again we discover that the compositions according to the invention possess better impact strength.

We claim:

1. A toughened multi-phase thermoplastic blend comprising:
   (a) 90–96 weight percent based on total blend of acrylonitrile/butadiene/styrene resin; and
   (b) 4–10 weight percent based on total blend of a terpolymer comprising 40–79 weight percent of polymer repeat units of ethylene, 15–40 weight percent of polymer repeat units of n-butyl acrylate and 6–20 weight percent of polymer repeat units of carbon monoxide having a melt flow index of 0.1–100 g/10 minutes, the blend having a flex modulus of at least 1,700 MPa.

2. The blend of claim 1 wherein the terpolymer has a melt flow index of 1 to 50 g/10 min.

3. The blend of claim 1 in the form of a self-supporting film, a self-supported sheet, a molded article, or tubing.

4. Process for the preparation of a toughened multiphase thermoplastic blend comprising admixing 90–96 weight percent based on total blend of acrylonitrile/butadiene/styrene resin, with 4–10 weight percent based on total blend of terpolymer comprising 40–79 weight percent of polymer repeat units of ethylene, 15–40 weight percent of polymer repeat units of n-butyl acrylate, and 6–20 weight percent of polymer repeat units of carbon monoxide having a melt flow index of 0.1–100 g/10 minutes, so that the blend has a flex modulus of at least 1,700 MPa.

* * * * *